(12) United States Patent
Fang et al.

(10) Patent No.: US 12,473,431 B2
(45) Date of Patent: Nov. 18, 2025

(54) SILICONE COMPOSITIONS AND THEIR APPLICATIONS

(71) Applicant: DOW SILICONES CORPORATION, Midland, MI (US)

(72) Inventors: Lei Fang, Shanghai (CN); Frederic Gubbels, Seneffe (BE)

(73) Assignee: DOW SILICONES CORPORATION, Midland, MI (US)

( * ) Notice: Subject to any disclaimer, the term of this patent is extended or adjusted under 35 U.S.C. 154(b) by 879 days.

(21) Appl. No.: 17/767,898

(22) PCT Filed: Oct. 22, 2020

(86) PCT No.: PCT/CN2020/122693
§ 371 (c)(1),
(2) Date: Apr. 10, 2022

(87) PCT Pub. No.: WO2021/068977
PCT Pub. Date: Apr. 15, 2021

(65) Prior Publication Data
US 2023/0102289 A1    Mar. 30, 2023

(30) Foreign Application Priority Data
Oct. 11, 2019    (WO) ................ PCT/CN2019/110567

(51) Int. Cl.
C08L 83/06 (2006.01)
C08G 77/18 (2006.01)
C08J 3/075 (2006.01)
C08K 3/22 (2006.01)

(52) U.S. Cl.
CPC ............ *C08L 83/06* (2013.01); *C08G 77/18* (2013.01); *C08J 3/075* (2013.01); *C08K 3/22* (2013.01); *C08J 2383/06* (2013.01); *C08K 2003/2227* (2013.01); *C08K 2201/001* (2013.01); *C08L 2203/206* (2013.01); *C08L 2312/08* (2013.01)

(58) Field of Classification Search
CPC ............ C08L 83/06; C08L 2203/206; C08L 2312/08; C08G 77/18; C08J 3/075; C08J 2383/06; C08K 3/22; C08K 2003/2227; C08K 2201/001
See application file for complete search history.

(56) References Cited

U.S. PATENT DOCUMENTS

| | | |
|---|---|---|
| 4,087,585 A | 5/1978 | Schulz |
| 4,359,078 A | 11/1982 | Egan |
| 5,194,649 A | 3/1993 | Okawa |
| 5,733,996 A | 3/1998 | De Buyl et al. |
| 6,512,072 B1 | 1/2003 | Gantner et al. |
| 6,642,309 B2 | 11/2003 | Komitsu et al. |
| 7,144,953 B2 | 12/2006 | Ueda et al. |
| 7,417,105 B2 | 8/2008 | Landon et al. |
| 7,893,170 B2 | 2/2011 | Wakioka et al. |
| 7,973,108 B2 | 7/2011 | Okamoto et al. |
| 8,030,371 B2 | 10/2011 | Chaussade |
| 8,231,944 B1 | 7/2012 | Schroeder |
| 8,609,797 B2 | 12/2013 | Knepper et al. |
| 8,686,094 B2 | 4/2014 | Djurdjevic et al. |
| 8,785,537 B2 | 7/2014 | Carrard et al. |
| 8,801,890 B2 | 8/2014 | Verosky et al. |
| 9,493,689 B2 | 11/2016 | Stanjek et al. |
| 9,527,985 B2 | 12/2016 | Okamatsu |
| 9,677,025 B2 | 6/2017 | Voge et al. |
| 9,732,203 B2 | 8/2017 | Okamatsu |
| 9,802,446 B2 | 10/2017 | Dahlke et al. |
| 10,150,888 B2 | 12/2018 | Simon et al. |
| 10,414,907 B2 | 9/2019 | Takahara |
| 10,717,870 B1 | 7/2020 | Gubbels et al. |
| 2006/0247349 A1 | 11/2006 | Kollmann et al. |
| 2009/0277549 A1 | 11/2009 | Tanno |
| 2010/0119715 A1 | 5/2010 | Sostmann et al. |
| 2010/0307655 A1 | 12/2010 | Tanno |
| 2015/0007938 A1 | 1/2015 | Stanjek et al. |
| 2015/0166859 A1 | 6/2015 | Choffat et al. |
| 2016/0001612 A1 | 1/2016 | Joo et al. |
| 2016/0009954 A1 | 1/2016 | Hanson |
| 2016/0340548 A1 | 11/2016 | Gubbels et al. |
| 2017/0015146 A1 | 1/2017 | Tyburski et al. |
| 2017/0297281 A1 | 10/2017 | Yukawa et al. |
| 2017/0348929 A1 | 12/2017 | Badaroux |
| 2018/0009951 A1* | 1/2018 | Gubbels ................ A61K 47/34 |
| 2018/0079263 A1 | 3/2018 | Tyburski et al. |
| 2018/0086158 A1 | 3/2018 | Bauer |

(Continued)

FOREIGN PATENT DOCUMENTS

| | | |
|---|---|---|
| CN | 105849213 A | 8/2016 |
| CN | 107207860 A | 9/2017 |

(Continued)

OTHER PUBLICATIONS

International Search Report for PCT/CN2020/122693 dated Dec. 30, 2020, 4 pages.
Noll, W., "Chemistry and Technology of Silicones", Academic Press Inc., New York, 1968, pp. 397-399.
Brook, Michael A., "Silicon in organic, organometallic and polymer chemistry", John Wiley & Sons, Inc. (2000), pp. 285-287.
M. Mikrut et al., "Silicone Rubber Tack I: Relation to Network Structure", The Journal of Adhesion, (2009), 85:7, pp. 395-412.

*Primary Examiner* — Shane Fang

(74) *Attorney, Agent, or Firm* — Warner Norcross + Judd LLP

(57) ABSTRACT

Provided are fast curing two-part condensation curable silicone compositions which cure by using titanium and/or zirconium based catalysts to generate cured gel materials which are suitable for encapsulating and/or potting electrical and/or electronic articles.

18 Claims, No Drawings

(56) References Cited

U.S. PATENT DOCUMENTS

| | | |
|---|---|---|
| 2018/0117974 A1 | 5/2018 | Jacob et al. |
| 2018/0126803 A1 | 5/2018 | Jacob et al. |
| 2019/0177584 A1 | 6/2019 | Gubbels et al. |
| 2019/0338077 A1 | 11/2019 | Chambard et al. |
| 2020/0063009 A1 | 2/2020 | Detemmerman et al. |

FOREIGN PATENT DOCUMENTS

| | | |
|---|---|---|
| CN | 108289827 A | 7/2018 |
| CN | 109476919 A | 3/2019 |
| CN | 109642078 A | 4/2019 |
| EP | 2397314 A1 | 12/2011 |
| EP | 2554617 A2 | 2/2013 |
| EP | 2562009 A2 | 2/2013 |
| EP | 3227128 B1 | 2/2018 |
| WO | 2009013309 A1 | 1/2009 |
| WO | 2013131330 A1 | 9/2013 |
| WO | 2016060229 A1 | 4/2016 |
| WO | 2016120270 A1 | 8/2016 |
| WO | 2017001997 A1 | 1/2017 |
| WO | 2017163219 A1 | 9/2017 |
| WO | 2018024856 A1 | 2/2018 |
| WO | 2018024857 A1 | 2/2018 |
| WO | 2018024858 A1 | 2/2018 |
| WO | 2018024859 A1 | 2/2018 |
| WO | 2018024860 A1 | 2/2018 |
| WO | 2018024861 A1 | 2/2018 |
| WO | 2018024865 A1 | 2/2018 |
| WO | 2018050503 A1 | 3/2018 |
| WO | 2018200796 A1 | 11/2018 |
| WO | 2019027668 A1 | 2/2019 |

* cited by examiner

SILICONE COMPOSITIONS AND THEIR APPLICATIONS

CROSS-REFERENCE TO RELATED APPLICATIONS

This application is the U.S. National Stage of International Application No. PCT/CN2020/122693 filed on 22 Oct. 2020, which claims priority to and all advantages of Application No. PCT/CN2019/110567 filed on 11 Oct. 2019, the content of which is incorporated herein by reference.

TECHNICAL FIELD

The present disclosure relates to fast curing two-part condensation curable silicone compositions which cure using titanium and/or zirconium based catalysts to generate cured gel materials and the applications for same.

BACKGROUND

In many instances silicone-based materials, such as gels, used as coating, potting, and encapsulating materials must maintain adhesion to substrates and/or other materials. In electronics for example, gels are a special class of encapsulants that cure to form an extremely soft material. Their major role being the protection of electronic assemblies and components from adverse environments by:
functioning as dielectric insulation,
protecting the circuit from moisture and other contaminants and
relieving mechanical and thermal stress on components.

In such situations the gels are required to adhere to electronic and electrical components and printed circuit boards in addition to the electrical connectors and conductors that pass through the coating or encapsulating material.

Commercial cured gel materials used to form encapsulants and pottants etc. (e.g., gels) are expensive being based on addition cure chemistry, i.e., they are cured by the reaction of a silicon hydride group with an unsaturated carbon radical with the help of a catalyst, which is typically a platinum based compound. Historically the industry has preferred addition cure compositions of this type for these applications because they immediately cure throughout the body of the composition resulting in a cured material in a matter of minutes whilst condensation cure systems are significantly slower, titanate cured condensation processes can take e.g., up to 7 days curing per 6 mm of depth of the body of the uncured material. Tin cured condensation systems do cure over a shorter period, but they are not desired for e.g., electronics applications because they undergo reversion (i.e., depolymerisation) at temperatures above 80° C.

Whilst, from a cure speed standpoint, materials made from hydrosilylation cure compositions are excellent, there are several potential problems and/or disadvantages with their use. For example, they are generally cured at elevated temperature (i.e., in excess of 100° C.) and can be contaminated and rendered uncurable due to inactivation of expensive platinum-based cure catalysts which are sensitive and may be poisoned by amine containing compounds, sulphur containing compounds and phosphorus containing compounds.

It is well known to people skilled in the art that alkoxy titanium compounds—i.e., alkyl titanates—are suitable catalysts for formulating one component moisture curable silicones (References: Noll, W.; Chemistry and Technology of Silicones, Academic Press Inc., New York, 1968, p. 399, Michael A. Brook, silicon in organic, organometallic and polymer chemistry, John Wiley & sons, Inc. (2000), p. 285). Titanate catalysts have been widely described for their use to formulate skin or diffusion cured one-part condensation curing cured gel materials e.g., elastomers and/or gels. These formulations are typically available in one-part packages that are applied in a layer that is thinner than typically 15 mm. Layers thicker than 15 mm are known to lead to uncured material in the depth of the material, because the moisture is very slow to diffuse in very deep sections. Skin or diffusion cure (e.g., moisture/condensation) takes place when the initial cure process takes place by the formation of a cured skin at the composition/air interface subsequent to the sealant/encapsulant being applied on to a substrate surface. Subsequent to the generation of the surface skin the cure speed is dependent on the speed of diffusion of moisture from the sealant/encapsulant interface with air to the inside (or core), and the diffusion of condensation reaction by-product/effluent from the inside (or core) to the outside (or surface) of the material and the gradual thickening of the cured skin over time from the outside/surface to the inside/core.

Until recently, (WO2018024858), multi component compositions designed to activate condensation cure in the bulk of the product did not use titanium-based catalysts. They generally use other metal catalysts such as tin or zinc catalysts, e.g., dibutyl tin dilaurate, tin octoate and/or zinc octoate (Noll, W.; Chemistry and Technology of Silicones, Academic Press Inc., New York, 1968, p. 397). In silicone compositions stored before use in two or more parts, one-part contains a filler which typically contains the moisture required to activate condensation cure in the bulk of the product. Unlike the previously mentioned diffusion cure one-part system, two-part condensation cure systems, once mixed together, enable bulk cure even in sections greater than 15 mm in depth. In this case the composition will cure (subsequent to mixing) throughout the material bulk. If a skin is formed, it will be only in the first minutes after application. Soon after, the product will become a solid in the entire mass.

Whilst two-part condensation cure silicone compositions have recently been disclosed which surprisingly can be cured with the use of alkyl titanates the speed of cure of such compositions can still hinder their use in applications requiring fast cure and/or flip over times, i.e., the point where the material does not flow anymore.

Typically, soft gels are obtained by formulating around a low crosslink density, i.e., by reducing the content of the crosslinker. As a result, the hardness and modulus of the product is reduced. Such products are useful as pottants for electronics to mitigate the impact of thermal cycles on the sensitive components. Hard or high modulus materials would induce high stress on the components during such cycles. Reducing the crosslinker content in the composition is however proportionally reducing the kinetics of cure. As a result, when the two parts are mixed it may take a long time before a non-sagging gel is formed.

The aim of the present disclosure is to provide fast curing, reversion free condensation curable gels (i.e., gels with tack free times of less than or equal to ($\leq$) 1 hour and flip over times at 25° C. of $\leq 3$ hours).

SUMMARY

There is provided a multiple part condensation curable gel composition comprising:

(i) at least one condensation curable silyl terminated polymer having at least two hydroxyl functional groups (silanol groups) per molecule and a viscosity less than or equal to (≤) 1000 mPa·s at 25° C.;

(ii) a cross-linker selected from silyl functional molecules having at least 2 silyl groups, each silyl group containing at least two hydrolysable groups having a viscosity≤1000 mPa·s at 25° C. but which viscosity is at least 75% of the viscosity of (i);

(iii) a condensation catalyst selected from the group of titanates, zirconates; and (iv) one or more reinforcing and/or non-reinforcing fillers; wherein (a) catalyst (iii) and filler (iv) are not stored together before cure;

(b) the ratio of Si—OH groups:Si-hydrolysable groups in the composition is from 0.4:1 to 0.95:1 and which upon curing (c) has a tack free time of ≤1 hour and a flip over time≤3 hours.

For the avoidance of doubt tack free time is the time in minutes required for a curing material to form a non-tacky surface film and flip over time marks the point in a cure process when a curing composition is no longer capable of flow.

There is also provided a cured gel material which is the reaction product of a multiple part condensation curable gel composition comprising:

(i) at least one condensation curable silyl terminated polymer having at least two hydroxyl functional groups (silanol groups) per molecule and a viscosity≤1000 mPa·s at 25° C.;

(ii) a cross-linker selected from silyl functional molecules having at least 2 silyl groups, each silyl group containing at least two hydrolysable group and a viscosity≤1000 mPa·s at 25° C. but which viscosity is at least 75% of the viscosity of (i);

(iii) a condensation catalyst selected from the group of titanates, zirconates; and (iv) one or more reinforcing and/or non-reinforcing fillers; wherein (a) catalyst (iii) and filler (iv) are not stored together before cure;

(b) the molar ratio of Si—OH groups:Si-alkoxy groups in the composition is from 0.4:1 to 0.95:1; and which (c) upon cure has a tack free time of ≤1 hour and a flip over time≤3 hours.

There is also provided a method of preparing a cured gel material as hereinbefore described; which method comprises mixing the multiple parts of the condensation curable gel composition together and applying the resulting mixture onto a substrate and allowing to cure.

There is also provided a use of a multiple part condensation curable gel composition as hereinbefore described in the manufacture of electronic assemblies and electronic components.

DETAILED DESCRIPTION

Hence the present disclosure provides a multiple part condensation curable gel composition using low viscosity polymers (≤1000 mPa·s at 25° C.) that are more available to cure with cross-linkers and having cross-linkers of a similar viscosity (≤1000 mPa·s at 25° C.). Whilst such low viscosity materials would be assumed to provide harder materials, when cured, because the ratio of Si—OH (silanol) groups: Si-alkoxy groups in the composition is from 0.4:1 to 0.95:1 the composition delivers soft gels.

In one alternative, the multiple part composition is a two part composition which upon cure provides materials which exhibit short cure times, e.g., tack free time (TFT) and flip over time during room temperature cure. Consequently, the hardness and the modulus of the product is reduced. The composition cures i.e., is curable at room temperature.

The multiple part condensation curable gel composition is typically stored in two parts prior to use. When the composition is a two-part composition there is preferably a part A comprising polymer (i) and reinforcing and/or non-reinforcing filler (iv) and a part B comprising the cross-linker (ii) and catalyst (iii). The reinforcing and/or non-reinforcing filler (iv), when present, and catalyst (iii) are stored in different parts.

The total silicon bonded hydroxyl (silanol/Si—OH) molar content is calculated for 100 g of the mixed formulation. The silicon bonded hydroxyl molar content related to a polymer is equal to the amount in g of hydroxyl containing polymer in 100 g of the mixed product divided by the number average molecular weight (Mn) of the polymer multiplied by the average number of hydroxyl functions present in the polymer, typically 2. If there are several hydroxyl functional polymers in the formulation, the molar content of each polymer is added up to constitute the total silanol molar content in the formulation.

The total hydrolysable groups molar content is calculated for 100 g of the mixed formulation. The molar content of hydrolysable groups related to a substance is equal to the amount in g of the molecule that contains the hydrolysable groups in 100 g of the mixed product divided by the molecular weight of the molecule or the number average molecular weight (Mn) in case it is a polymeric molecule multiplied by the average number of hydrolysable functions present in the molecule. The molar content of each molecule or polymer is added up to constitute the total molar content of hydrolysable groups in the formulation. Typically, each hydrolysable group is an alkoxy group.

The molar ratio of silicon bonded hydroxyl (silanol) groups in polymer (i) to hydrolysable groups from cross-linker (ii) is then calculated by dividing the total molar content of silicon bonded hydroxyl (Si—OH) groups in polymer (i) by the total molar content of hydrolysable groups from cross-linker (ii) or may be depicted as a ratio.

The number average molecular weight (Mn) and weight average molecular weight (Mw) of silicone can also be determined by Gel permeation chromatography (GPC). This technique is a standard technique, and yields values for Mw (weight average), Mn (number average) and polydispersity index (PI) (where PI=Mw/Mn).

Mn value provided in this application have been determined by GPC and represent a typical value of the polymer used. If not provided by GPC, the Mn may also be obtained from calculation based on the dynamic viscosity of said polymer.

The main advantages of these compositions are that they cure at room temperature, to form gels with the titanate/zirconate condensation catalyst utilised being more resistant to contaminants than platinum cure silicones and which provides, unlike tin catalysed compositions, a resistance to reversion when subjected to high temperature and high humidity. It has been identified that cure of these compositions is much faster than typical titanate or zirconate catalysed condensation reactions would anticipate, i.e., can be lower than 1 hour as opposed to days for standard one-part titanate cured materials.

Polymer (i) is at least one condensation curable silyl terminated polymer having at least two hydroxyl functional groups per molecule and a viscosity≤1000 mPa·s at 25° C.

Any suitable moisture/condensation curable silyl terminated polymer may be utilised including polydialkyl siloxanes, alkylphenyl siloxane, or organic based polymers with silyl terminal groups e.g., silyl polyethers, silyl acrylates and silyl terminated polyisobutylenes or copolymers of any of the above. Preferably the polymer is a polysiloxane based polymer containing at least two Si-hydroxyl (silanol) containing groups most preferably the polymer comprises terminal Si-hydroxyl (silanol) containing groups. Examples of suitable Si-hydroxyl (silanol) containing terminal groups include —Si(OH)$_3$, —(R$^a$)Si(OH)$_2$, —(R$^a$)Si(OH)$_2$, or —(R$^a$)$_2$ Si(OH), or —(R$^a$)$_2$ Si—R$^c$—SiR$^d_p$(OH)$_{3-p}$ where each R$^a$ independently represents a monovalent hydrocarbyl group, for example, an alkyl group, in particular having from 1 to 8 carbon atoms, (and is preferably methyl); each R$^d$ group is independently an alkyl or alkoxy group in which the alkyl groups suitably have up to 6 carbon atoms; le is a divalent hydrocarbon group which may be interrupted by one or more siloxane spacers having up to six silicon atoms; and p has the value 0, 1 or 2. For example each R$^a$ may be methyl, R$^c$ may be an ethylene or propylene group, alternatively an ethylene group and p is zero, i.e., -(Me)$_2$Si—CH$_2$—CH$_2$—Si(OH)$_3$.

Preferably polymer (i) has the general formula:

$$X^3\text{-}A\text{-}X^1 \tag{1}$$

where X$^3$ and X$^1$ are independently selected from Si-hydroxyl (silanol) containing terminal groups, A is a siloxane and/or organic containing polymeric chain, alternatively a siloxane polymeric chain.

Examples of hydroxyl (silanol) containing terminal groups-terminating groups X$^3$ or X$^1$ include
—Si(OH)$_3$, —(R$^a$)Si(OH)$_2$, —(R$^a$)$_2$Si(OH), or —(R$^a$)$_2$ Si—R$^c$—Si (R$^d_p$)(OH)$_{3-p}$ as defined above. Preferably the X$^3$ and/or X$^1$ are hydroxydialkyl terminated, e.g., hydroxydimethyl terminated or.

Examples of suitable siloxane groups in polymeric chain A of formula (I) are those which comprise a polydiorganosiloxane chain. Thus, polymeric chain A preferably includes siloxane units of formula (2)

$$—(R^5_sSiO_{(4-s)/2})— \tag{2}$$

in which each R$^5$ is independently an organic group such as a hydrocarbyl group having from 1 to 10 carbon atoms optionally substituted with one or more halogen group such as chlorine or fluorine and s is 0, 1 or 2, typically s has an average value of about 2. Particular examples of groups R$^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups R$^5$ are methyl.

The polymers (i) herein have a viscosity of ≤1000 at 25° C. mPa·s, alternatively 250 to 1000 mPa·s at 25° C. alternatively 250 to 750 mPa·s at 25° C. measured by using a Brookfield cone plate viscometer (RV DIII) using the most suitable cone plate for the viscosity concerned.

Preferred polysiloxanes containing units of formula (2) are thus polydiorganosiloxanes having terminal, silicon-bound hydroxyl groups, otherwise referred to as silanol containing terminal groups (Si—OH). The polydiorganosiloxanes may be homopolymers or copolymers. Mixtures of different polydiorganosiloxanes having silanol containing terminal groups are also suitable.

Furthermore, the composition may contain polymers having one Si-hydroxyl (silanol) containing terminal group for example one —Si(OH)$_3$, —(R$^a$)Si(OH)$_2$, —(R$^a$)$_2$Si(OH), or —(R$^a$)$_2$ Si—R$^c$—SiR$^d_p$(OH)$_{3-p}$ as defined above, e.g., a dialkylhydroxy terminated group and one unreactive terminal group e.g., a trialkyl terminated, i.e., trimethyl terminated group. Hence, polymer (i) may additionally comprise polydiorganosiloxanes which are partially dialkylhydroxy terminated and partially trialkyl terminated. The inclusion of such additional polymers can reduce modulus of elasticity of the resulting product after cure and/or improve adhesion to hard-to-adhere substrates. Such additional polymers (i) may be of an analogous viscosity to those previously described.

The polymer (i) may alternatively be an organic based polymer having silyl terminal groups, each bearing at least one —OH group. Typical silyl terminated polymers groups include silyl terminated polyethers, silyl terminated acrylates and silyl terminated polyisobutylenes. The silyl groups utilised will be one or more alternatives described above as X$_1$ and X$_3$ as discussed above.

In accordance with the present invention polymeric chain A may alternatively be organic based polymers with silyl terminal groups e.g., silyl polyethers, silyl acrylates and silyl terminated polyisobutylenes. In the case of silyl polyethers the polymer chain is based on polyoxyalkylene based units. Such polyoxyalkylene units preferably comprise a linear predominantly oxyalkylene polymer comprised of recurring oxyalkylene units, (—C$_n$H$_{2n}$—O—) illustrated by the average formula (—C$_n$H$_{2n}$—O—)$_y$ wherein n is an integer from 2 to 4 inclusive and y is an integer of at least four. Likewise, the viscosity will have a viscosity of ≤1000 at 25° C. mPa·s, alternatively 250 to 1000 mPa·s at 25° C. alternatively 250 to 750 mPa·s at 25° C. and will have a suitable number average molecular weight of each polyoxyalkylene polymer block present. Moreover, the oxyalkylene units are not necessarily identical throughout the polyoxyalkylene monomer but can differ from unit to unit. A polyoxyalkylene block or polymer, for example, can be comprised of oxyethylene units, (—C$_2$H$_4$—O—); oxypropylene units (—C$_3$H$_6$—O—); or oxybutylene units, (—C$_4$H$_8$—O—); or mixtures thereof.

Other polyoxyalkylene units may include for example: units of the structure $$—[—R^e—O—(—R^f—O—)_w\text{-Pn-}CR^g_2\text{-Pn-O—}(— R^f—O—)_q—R^e]—$$

in which Pn is a 1,4-phenylene group, each R$^e$ is the same or different and is a divalent hydrocarbon group having 2 to 8 carbon atoms, each R$^f$ is the same or different and, is, an ethylene group or propylene group, each R$^g$ is the same or different and is, a hydrogen atom or methyl group and each of the subscripts w and q is a positive integer in the range from 3 to 30.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

The composition also comprises cross-linkers (ii). Cross-linkers (ii) used herein are generally silyl functional molecules having at least 2 silyl groups, each silyl group containing at least two hydrolysable groups having a viscosity≤1000 mPa·s at 25° C. but which viscosity is at least 75% of the viscosity of polymer (i), alternatively a viscosity≤1000 mPa·s at 25° C. but which viscosity is at least 90% of the viscosity of polymer (i), alternatively viscosity≤1000 mPa·s at 25° C. but which viscosity is the same or greater than the viscosity of polymer (i).

For the sake of the disclosure herein a silyl functional molecule is a silyl functional molecule containing two or more silyl groups, each silyl group containing at least two hydrolysable groups. Hence, a disilyl functional molecule comprises two silicon atoms each having at least one hydrolysable group, where the silicon atoms are separated by an organic or siloxane polymer backbone. Typically, the silyl groups on the disilyl functional molecule may be terminal groups. The polymeric backbone may be a polymeric chain.

For the avoidance of doubt the cross-linker is not a disilane where two silicon atoms are bonded directly to one another.

The hydrolysable groups on the silyl groups include acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and alkenyloxy groups (for example isopropenyloxy and 1-ethyl-2-methylvinyloxy). In a preferred embodiment each hydrolysable group is an alkoxy group.

In one embodiment the cross-linker (ii) is a silyl functional molecule having at least 2 silyl groups each silyl group having two or three hydrolysable groups, alternatively each silyl group has at least two hydrolysable groups, alternatively each silyl group has three hydrolysable groups In one embodiment each silyl group contains three alkoxy groups having 1 to 6 carbons, alternatively three alkoxy groups selected from methoxy and/or ethoxy, alternatively three methoxy groups. Cross-linker (ii) of said may additionally comprises silyl functional molecules having at least 2 silyl groups, wherein at least one silyl group contains one hydrolysable group.

The silyl (e.g., disilyl) functional crosslinker (ii) may have a siloxane or organic polymeric backbone. Suitable polymeric crosslinkers (ii) may have a similar polymeric backbone chemical structure to polymeric chain A as depicted in formula (1) above. In the case of such siloxane or organic based cross-linkers the molecular structure can be straight chained, branched, cyclic or macromolecular, i.e., a silicone or organic polymer chain bearing alkoxy functional end groups include polydimethylsiloxanes having at least one trialkoxy terminal where the alkoxy group may be a methoxy or ethoxy group.

Hence, the terminal silyl groups may have the formula such as $-R^a Si(OR^b)_2$, $-Si(OR^b)_3$, $-R^a_2 SiOR^b$ or $-(R^a)_2 Si-R^c-SiR^d_p(OR^b)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl group having up to 6 carbon atoms; $R^c$ is a divalent hydrocarbon group which may be interrupted by one or more siloxane spacers having up to six silicon atoms; and p has the value 0, 1 or 2. Typically each terminal silyl group will have 2 or 3 alkoxy groups. For example, each $R^a$ may be methyl, $R^c$ is an ethylene or propylene group, alternatively an ethylene group and p is zero, i.e., -(Me)$_2$Si—CH$_2$—CH$_2$—Si(OMe)$_3$.

In one embodiment, the crosslinker (ii) may be a disilyl functional polymer, that is, a polymer containing two silyl groups, each containing at least one hydrolysable group such as described by the formula (4)

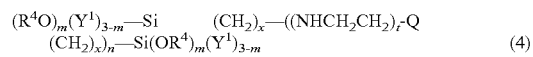

$(R^4O)_m(Y^1)_{3-m}$—Si  $(CH_2)_x$—$((NHCH_2CH_2)_t$-Q
$(CH_2)_x)_n$—Si$(OR^4)_m(Y^1)_{3-m}$ (4)

where $R^4$ is a $C_{1-10}$ alkyl group, $Y^1$ is an alkyl groups containing from 1 to 8 carbons, Q is a chemical group containing a heteroatom with a lone pair of electrons e.g., an amine, N-alkylamine, or urea; each x is an integer of from 1 to 6, t is 0 or 1; each m is independently 1, 2 or 3 and n is 0 or 1.

Crosslinkers (ii) thus include for the sake of example, 1,6-bis (trimethoxysilyl)hexane (alternatively known as hexamethoxydisilylhexane), bis (trialkoxysilylalkyl)amines, bis (dialkoxyalkylsilylalkyl)amine, bis (trialkoxysilylalkyl) N-alkylamine, bis (dialkoxyalkylsilylalkyl) N-alkylamine, bis (trialkoxysilylalkyl)urea, bis (dialkoxyalkylsilylalkyl) urea, bis (3-trimethoxysilylpropyl)amine, bis (3-triethoxysilylpropyl)amine, bis (4-trimethoxysilylbutyl)amine, bis (4-triethoxysilylbutyl)amine, bis (3-trimethoxysilylpropyl) N-methylamine, bis (3-triethoxysilylpropyl) N-methylamine, bis (4-trimethoxysilylbutyl) N-methylamine, bis (4-triethoxysilylbutyl) N-methylamine, bis (3-trimethoxysilylpropyl)urea, bis (3-triethoxysilylpropyl)urea, bis (4-trimethoxysilylbutyl)urea, bis (4-triethoxysilylbutyl) urea, bis (3-dimethoxymethylsilylpropyl)amine, bis (3-diethoxymethyl silylpropyl)amine, bis (4-dimethoxymethylsilylbutyl)amine, bis (4-diethoxymethyl silylbutyl)amine, bis (3-dimethoxymethylsilylpropyl) N-methylamine, bis (3-diethoxymethyl silylpropyl) N-methylamine, bis (4-dimethoxymethylsilylbutyl) N-methylamine, bis (4-diethoxymethyl silylbutyl) N-methylamine, bis (3-dimethoxymethylsilylpropyl)urea, bis (3-diethoxymethyl silylpropyl)urea, bis (4-dimethoxymethylsilylbutyl)urea, bis (4-diethoxymethyl silylbutyl)urea, bis (3-dimethoxyethylsilylpropyl)amine, bis (3-diethoxyethyl silylpropyl)amine, bis (4-dimethoxyethylsilylbutyl)amine, bis (4-diethoxyethyl silylbutyl)amine, bis (3-dimethoxyethylsilylpropyl) N-methylamine, bis (3-diethoxyethyl silylpropyl) N-methylamine, bis (4-dimethoxyethylsilylbutyl) N-methylamine, bis (4-diethoxyethyl silylbutyl) N-methylamine, bis (3-dimethoxyethylsilylpropyl)urea bis (3-diethoxyethyl silylpropyl)urea, bis (4-dimethoxyethylsilylbutyl)urea and/or bis (4-diethoxyethyl silylbutyl)urea; bis (triethoxysilylpropyl) amine, bis (trimethoxysilylpropyl)amine, bis (trimethoxysilylpropyl)urea, bis (triethoxysilylpropyl)urea, bis (di-ethoxymethylsilylpropyl)N-methylamine; di or trialkoxy silyl terminated polydialkyl siloxane, di or trialkoxy silyl terminated polyarylalkyl siloxanes, di or trialkoxy silyl terminated polypropyleneoxide, polyurethane, polyacrylates; polyisobutylenes; di or triacetoxy silyl terminated polydialkyl; polyarylalkyl siloxane; di or trioximino silyl terminated polydialkyl; polyarylalkyl siloxane; di or triacetonoxy terminated polydialkyl or polyarylalkyl. The cross-linker (ii) used may also comprise any combination of two or more of the above.

As previously indicated the ratio of Si—OH groups:Si-alkoxy groups in the composition is from 0.4:1 to 0.95:1; alternatively is from 0.5:1 to 0.75:1.

The composition further comprises a condensation catalyst (iii) which increases the speed at which the composition cures. The catalyst chosen depends upon the speed of cure required. Titanate and/or zirconate based catalysts may comprise a compound according to the general formula Ti[OR$^{22}$]$_4$ or Zr[OR$^{22}$]$_4$ where each R$^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^{22}$ include but are not restricted to methyl, ethyl, propyl, isopropyl, butyl, tertiary butyl and a branched secondary alkyl group such as 2, 4-dimethyl-3-pentyl. Preferably, when each $R^{22}$ is the same, $R^{22}$ is an isopropyl, branched secondary alkyl group or a tertiary alkyl group, in particular tertiary butyl. Suitable examples include for the sake of example, tetra n-butyl titanate, tetra t-butyl titanate, tetra t-butoxy titanate, tetraisopropoxy titanate and diisopropoxydiethylacetoacetate titanate. Alternatively, the titanate may be chelated. The chelation may be with any suitable chelating agent such as an alkyl acetylacetonate such as methyl or ethylacetylacetonate. Alternatively, the titanate may be monoalkoxy titanates bearing three chelating agents such as for example 2-propanolato, tris isooctadecanoato titanate.

In one embodiment, the catalyst is present in a molar amount which is at least 50% of the molar amount of moisture (i.e., water) present cumulatively in Part A and Part B of the composition from the filler (s) therein as determined in accordance with ISO 787-2:1981. Typically, the vast majority of the moisture will originate from the reinforcing and/or non-reinforcing fillers.

The multiple part condensation curable gel composition herein additionally comprises one or more reinforcing and/or non-reinforcing fillers. The one or more reinforcing and/or non-reinforcing fillers (iv) may be hydrous fillers. For the sake of this application the term hydrous means that the filler(s) have a moisture (i.e., water) content of >0.05% by weight as determined in accordance with ISO 787-2:1981. Where required the quantitative amount of moisture (water) present in the filler may be determined by the extraction of moisture (water) from samples of the filler used in our compositions. using the test method of ISO787 2:1981. For the avoidance of doubt use of the term moisture is intended to mean water and does not include Si-alkoxy groups or Si bonded hydroxyl groups in both cases discussed elsewhere.

Examples of finely divided, reinforcing fillers include high surface area fumed and precipitated silicas including rice hull ash and to a degree calcium carbonate. Examples of or additional finely divided non-reinforcing fillers include as crushed quartz, diatomaceous earths, barium sulphate, iron oxide, titanium dioxide and carbon black, talc, wollastonite. Other fillers which might be used alone or in addition to the above include carbon nanotubes, e.g., multiwall carbon nanotubes aluminite, hollow glass spheres, calcium sulphate (anhydrite), gypsum, calcium sulphate, magnesium carbonate, clays such as kaolin, aluminium trihydroxide, magnesium hydroxide (brucite), graphite, copper carbonate, e.g., malachite, nickel carbonate, e.g., zarachite, barium carbonate, e.g., witherite and/or strontium carbonate e.g., strontianite.

Further alternative fillers include aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$.

The ring silicates group comprises silicate minerals, such as but not limited to, cordierite and $Al_3(Mg,Fe)_2[Si_4AlO_{18}]$.

The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite. The fillers may be hydrous fillers as defined above.

The filler(s) may optionally be surface treated with a treating agent. Treating agents and treating methods are known in the art. The surface treatment of the filler(s) is typically performed, for example with a fatty acid or a fatty acid ester such as a stearate, or with organosilanes, organosiloxanes, or organosilazanes such as hexaalkyl disilazane or short chain siloxane diols. Generally, the surface treatment renders the filler(s) hydrophobic and therefore easier to handle and obtain a homogeneous mixture with the other components in the composition. Silanes such as

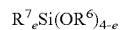

wherein $R^7$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, with the alkyl groups of 6 to 20 carbon atoms being preferred. $R^6$ is an alkyl group of 1 to 6 carbon atoms, and letter e is equal to 1, 2 or 3 may also be utilised as the treating agent for fillers.

Optional Ingredients
Adhesion Promoter

Suitable adhesion promoters may comprise alkoxysilanes of the formula $R^{14}{}_h Si(OR^{15})_{(4-h)}$, where subscript h is 1, 2, or 3, alternatively h is 3. Each $R^{14}$ is independently a monovalent organofunctional group. $R^{14}$ can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^{15}$ is exemplified by methyl, ethyl, n-propyl, and iso-propyl.

Examples of suitable adhesion promoters include glycidoxypropyltrimethoxysilane and a combination of glycidoxypropyltrimethoxysilane with an aluminium chelate or zirconium chelate. Examples of adhesion promoters for hydrosilylation curable compositions may be found in U.S. Pat. Nos. 4,087,585 and 5,194,649. The curable composition may comprise, when present, 0.01% to 2 wt. %, alternatively 0.05 to 2 wt. %, alternatively 0.1 to 1 wt. % of adhesion promoter based on the weight of the composition. Preferably, the speed of hydrolysis of the adhesion promoter should be lower than the speed of hydrolysis of the crosslinker in order to favour diffusion of the molecule towards the substrate rather than its incorporation in the product network.

Additional Fillers

Thermally and/or electrically conductive fillers e.g., metallic fillers, and anhydrous meltable fillers, or a combination thereof maybe present. Metallic may be utilised. Such fillers include particles of metals and particles of metals having layers on the surfaces of the particles. These layers may be, for example, metal nitride layers or metal oxide layers on the surfaces of the particles. Suitable metallic fillers are exemplified by particles of metals selected from the group consisting of aluminium, copper, gold, nickel, tin, silver, and combinations thereof, and alternatively aluminium. Suitable metallic fillers are further exemplified by particles of the metals listed above having layers on their surfaces selected from the group consisting of aluminium nitride, aluminium oxide, copper oxide, nickel oxide, silver oxide, and combinations thereof. For example, the metallic filler may comprise aluminium particles having aluminium oxide layers on their surfaces.

Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point ranging from 50° C. to 250° C., alternatively 150° C. to 225° C. The meltable filler may be a eutectic alloy, a non-eutectic alloy, or a pure metal. Meltable fillers are commercially available.

The thermally conductive filler may be a single thermally conductive filler or a combination of two or more thermally conductive fillers that differ in at least one property such as particle shape, average particle size, particle size distribution, and type of filler. In some embodiments, combinations of metallic and inorganic fillers, such as a combination of aluminium and aluminium oxide fillers; a combination of aluminium and zinc oxide fillers; or a combination of aluminium, aluminium oxide, and zinc oxide fillers may be used. In other embodiments, it may be desirable to combine a first conductive filler having a larger average particle size with a second conductive filler having a smaller average particle size in a proportion meeting the closest packing theory distribution curve. An example would be mixing two aluminium oxide preparations having different average particle sizes. In other embodiments, different thermally conductive filler materials with difference sizes may be used, for example, a combination of an aluminium oxide having a larger average particle size with a zinc oxide having a smaller average particle size. Alternatively, it may be desirable to use combinations of metallic fillers, such as a first aluminium having a larger average particle size and a second aluminium having a smaller average particle size. Use of a first filler having a larger average particle size and a second filler having a smaller average particle size than the first filler may improve packing efficiency, may reduce viscosity, and may enhance heat transfer.

The shape of the thermally conductive filler particles is not specifically restricted, however, rounded or spherical particles may prevent viscosity increase to an undesirable level upon high loading of the thermally conductive filler in the composition. The average particle size of the thermally conductive filler will depend on various factors including the type of thermally conductive filler selected and the exact amount added to the curable composition, as well as the bond line thickness of the device in which the cured product of the composition will be used. In some instances, the thermally conductive filler may have an average particle size ranging from 0.1 micrometres to 80 micrometres, alternatively 0.1 micrometres to 50 micrometres, and alternatively 0.1 micrometres to 10 micrometres. The additional optional fillers may also be treated with treating agents as described above should the need arise.

Other optional additives include a surfactant, a flux agent, an acid acceptor, and/or an anti-corrosion additive and a combination thereof.

Suitable surfactants include silicone polyethers, ethylene oxide polymers, propylene oxide polymers, copolymers of ethylene oxide and propylene oxide, other non-ionic surfactants, and combinations thereof. The composition may comprise up to 0.05% of the surfactant based on the weight of the composition.

Plasticiser

The composition may comprise an unreactive silicone polymer which functions as a plasticiser. Such an unreactive silicone polymer is typically a trialkylsilyl terminated polydimethylsiloxane having a viscosity of from 200 to 2000 mPa·s at 25° C.

Flux Agent

The composition may comprise up to 2 wt. % of a flux agent based on the weight of the composition. Molecules containing chemically active functional groups such as carboxylic acid and amines can be used as flux agents. Such flux agents can include aliphatic acids such as succinic acid, abietic acid, oleic acid, and adipic acid; aromatic acids such as benzoic acids; aliphatic amines and their derivatives, such as triethanolamine, hydrochloride salts of amines, and hydrobromide salts of amines. Flux agents are known in the art and are commercially available.

Acid Acceptor

Suitable acid acceptors include magnesium oxide, calcium oxide, and combinations thereof. The composition may comprise up to 2 wt. % of Acid Acceptor based on the weight of the composition, if appropriate.

Anti corrosion additives, such as nitrogen/sulphur containing heterocyclic compounds containing a triazole structure, a thiadiazole structure, a benzotriazole structure, a mercaptothiozole structure, a mercaptobenzothiazole structure or a benzimidazole structure.

As previously indicated the condensation curable composition is stored in a multiple part manner, typically in two parts and polymer (i), cross-linker (ii) and catalyst (iii) are not all stored together in the same part. Furthermore, filler (iv) and the catalyst (iii) are typically kept separate with the filler (iv) being mixed into the polymer (i). The two parts of the composition may be mixed using any appropriate standard two-part mixing equipment with a dynamic or static mixer and the resulting mixture is optionally dispensed therefrom for use in the application for which it is intended. The two-part composition might for example comprise any one of the following alternatives:

1) stored in two parts Part A having polymer (i) and cross-linker (ii) and Part B having polymer (i) and catalyst (iii); or
2) stored in two parts Part A having polymer (i) and catalyst (iii) and Part B having cross-linker (ii) or
3) stored in two parts, Part A having a first polymer (i) and cross-linker (ii) and Part B having second polymer (i) and catalyst (iii) or
4) stored in two parts, Part A containing polymer (i) and part B containing the cross-linker (ii) and catalyst (iii). Typically, the filler (iv) is stored in the part which does not contain the catalyst.

The composition may alternatively be stored in three or more parts should the need arise. Additional additives are generally added into Part A. whilst it is anticipated that the vast majority if not all moisture in the composition will be in the hydrous filler, should any other ingredient including the optional ingredients contain moisture (water) in any form the amount of catalyst will be determined based on the total moisture content from all sources which is the value determined through ISO 787-2:1981.

There is also provided herein a method of making a gel material as hereinbefore described whereby the two parts of the composition are intermixed and cured. Subsequent to intermixing in one embodiment the condensation curable gel composition may be applied on to a substrate using a suitable dispenser such as for example curtain coaters, spray devices die coaters, dip coaters, extrusion coaters, knife coaters and screen coaters which upon gel formation provides a coating on said substrate. The composition is then cured.

The substrate may be an electrical, electronic or optical component or may be is precured as required and then fitted in to or onto e.g., an electrical, electronic or optical component. The composition herein may adhere to various substrates such as electrical or electronic components and/or parts, not least metal substrates such as gold, silver, aluminium, copper, and electroless nickel; as well as polymeric substrates such as FR4, Nylon, polycarbonate, Lucite (which is polymethylmethacrylate, PMMA), polybutylene terephthalate (PBT), and liquid crystal polymers such as Xydar®, available from Solvay Chemicals, Houston, Tex. 77098 USA.

Any suitable electrical or electronic part may be sealed with the cured gel material as described above but because the cured gel material herein can suppress the occurrence of air bubbles and cracks and exhibits good bonding to electrical or electronic parts even under high-temperature conditions, it can be advantageously used in power devices used under high-temperature conditions, particularly power devices such as a motor control, a motor control for transport, a power generation system, or a space transportation system. Such products are useful as pottant for electronics to mitigate the impact of thermal cycles on the sensitive components.

Furthermore, because the cured gel material of the present invention has a certain degree of cold resistance in addition to the heat resistance demanded in an Si—C semiconductor chip (for example, heat resistance of 180° C. or above). The electronic article can be a power module, e.g., one or more of the aforementioned devices for power converters, inverters, boosters, traction controls, industrial motor controls, power distribution and transportation systems, especially in power devices that demand the ability to withstand sharp temperature differences and can improve the durability and reliability of such power devices. It may be designed for use in optical applications and electronics applications, including both microelectronics and macroelectronics applications as well as optoelectronics applications and thermally conductive electronics applications, such as making thermally conductive adhesives. Furthermore, the cured gel material of the present invention may be transparent and therefore may be potentially suitable for use as an encapsulant for light guides e.g., those used to make an optoelectronic device comprising the light guide and at least one light element. The optoelectronic device may comprise at least one light element and a free-standing light guide e.g., a composite light guide configured to transmit light when light is emitted from one or more light elements.

The cured gel material herein may function as an optical encapsulant for encapsulating the at least one light element. The light guide might also include a lens for controlling direction of light being emitted from the at least one light element, at least one electrical connector for conducting electricity to the at least one light element, or any combination of two or more or all of the preceding additional elements.

The electrical connector(s) independently may be a wire, tabbing, or ribbon and may be made of a highly conductive metal such as Cu, Au, Ag, and alloys thereof. Such optoelectronic devices may be used to make luminaires (devices having at least one light element that is a light-generating element). The luminaire may comprise an optoelectronic device of any one of the preceding embodiments and a power supply for powering the at least one light element. The luminaire may further comprise a lens for controlling direction of light being emitted from the at least one light element, at least one electrical connector for conducting electricity to the at least one light element.

The power supply may be in operative electrical communication with the at least one light element via electrical connector(s). Each of the above light emitting devices may be a light-emitting diode (LED), a liquid crystal display (LCD), or any other light source. In the absence of filler, the composition as described herein is transparent and/or optically clear and as such is particularly suitable for protecting LED and/or LCD lighting from the environment. Such a material when used as an encapsulant has several significant advantages over commercial products, namely it has a satisfactorily high light transmission, it ages without any substantial discolouration (i.e., yellowing); the composition prior to cure, even after the separate parts have been mixed is at a relatively low viscosity; it is designed to have rapid room temperature cure, i.e., subsequently to mixing it cures in the bulk of the composition not from the air-sealant interface as is the case for most titanate type catalyst; and importantly in has proven adhesion to an assortment of electric substrates with and without. Furthermore, given the cross-linker (ii) used, the 2-part composition may be mixed in a 1 to 1 ratio as discussed above. It is not sensitive to inhibition or reversion as is the case for Pt and tin based catalysts respectively.

Examples of such power devices that demand heat resistance and cold resistance include motor controls used in cold regions such as general-purpose inverter controls, servo motor controls, machine tools or elevators, electric vehicles, hybrid cars or motor controls for rail transport used in cold regions, power generating systems used in cold regions such as solar, wind or fuel cell power generators, space transportation systems used in space, and the like. Note that "cold regions" indicates regions where the temperature falls below 0° C.

Furthermore, the cured gel material is also effective in sealing electrical or electronic parts having a structure in which the space between electrodes, between electrical elements or between an electrical element and the package in the electrical or electronic part is narrow, or having a structure in which these structures cannot track to the expansion and contraction of the cured gel material. For example, it may be used in electrical circuits or modules on which electrical elements such as semiconductor elements, capacitors and resistors are mounted, i.e., various sensors such as pressure sensors that are generally sealed or filled with cured gel material, and automotive igniters, regulators and the like.

The electronic component may be defined as a chip, such as a silicon chip or a silicon carbide chip, one or more wires, one or more sensors, one or more electrodes, integrated circuits (ICs), e.g., hybrid ICs, power devices, insulated gate bipolar transistor (IGBT), a rectifier such as a Schottky diode, a PiN diode, a merged PiN/Schottky (MPS) rectifier and Junction barrier diode, a bipolar junction transistors (BJTs), a thyristor, a metal oxide field effect transistor (MOSFET), a high electron mobility transistor (HEMT), a static induction transistors (SIT), a power transistor, and the like.

The electronic article may include the electronic component and a first layer. The first layer is not particularly limited and may be a semiconductor, a dielectric, metal, plastic, carbon fibre mesh, metal foil, a perforated metal foil (mesh), a filled or unfilled plastic film (such as a polyamide sheet, a polyimide sheet, polyethylene naphthalate sheet, a polyethylene terephthalate polyester sheet, a polysulphone sheet, a polyether imide sheet, or a polyphenylene sulphide sheet), or a woven or nonwoven substrate (such as fibreglass cloth, fibreglass mesh, or aramid paper). Alternatively, the first layer may be further defined as a semiconductor and/or dielectric film.

The cured gel material may be sandwiched between the electronic component and the first layer, and/or may be disposed on and in direct contact with the first layer, and/or on and in direct contact with the electronic component. If the cured gel material is disposed on and in direct contact with the first layer, the cured gel material may still be disposed on the electronic component but may include one or more layers or structures between the cured gel material and the electronic component.

Equally the composition may also contain light scattering particles such as $TiO_2$ and silica which is seen to be of significant benefit for LED light encapsulation.

The article may be a power electronic article e.g., an electronic component with material composition disposed thereon such that the cured material encapsulates, either partially or completely, the electronic component. Alternatively, the electronic article may be an integrated circuit (IC), or light emitting diodes (LED) system or may be a printed circuit board (PCB).

EXAMPLES

The following provides details of the ingredients listed below in Tables 1 and 4:
  Adhesion promoter 1 was a mixture (by weight) of 53.5% of methyl trimethoxysilane, 27.4% of 3-glycidoxypropyl trimethoxy silane and 21.8% of 3-aminopropyl triethoxy silane pre-condensed;
  Filler 1 was untreated quartz sold under the Trade mark Sebelco® 708 Quartz having a particle size of 7 to 8 μm. The moisture content of Sebelco® 708 Quartz is around 0.24% in weight determined by ISO 787-2: 1981;
  Filler 2 was untreated quartz sold under the Trade mark Sikron® SF600 Quartz having a particle size of about 3 μm. The moisture content of Sikron SF600 is around 0.24% in weight determined by ISO 787-2:1981;
  The conductive filler used was a commercially available aluminium trihydroxide, sold under the trade name HUAYA® LA4 sold by Foshan Huaya Superfine Powder Co. Ltd. It was used untreated and has a particle size of 15-17 μm, a moisture content of ≤0.4 wt. % and a pH of about 8.5.
  Cross-linker 1 was a polydimethylsiloxane terminated with -(Me)$_2$Si—CH$_2$—CH$_2$—Si(OMe)$_3$ groups having a viscosity of 450 mPa·s at 25° C.; and
  Cross-linker 2 was a polydimethylsiloxane terminated with -(Me)$_2$Si—CH$_2$—CH$_2$—Si(OMe)$_3$ groups having a viscosity of 2200 mPa·s at 25° C.
All viscosity measurements were made in accordance with ASTM D4287-00 using a Brookfield. DV-III Ultra Rheometer type cone/plate rheometer with spindle No. 3 rotated at 100 rpm at room temperature (about 25° C.) unless otherwise indicated.

The terms "silanol", "hydroxysilyl", "SiOH" and silicon bonded hydroxyl may be used interchangeably in the scope of the present invention, to indicate a condensation curable silyl terminating group of a polymer, bearing at least one hydroxyl functional group.

The terms "alkoxy", "SiOR" may be used interchangeably in the scope of the present invention, to indicate a condensation curable silyl terminating group of a polymer, bearing at least one hydrolysable functional group.

The terms "ratio SiOH/SiOR" and "ratio silanol/alkoxy groups" may also be used interchangeably, in the scope of the present invention.

Examples in accordance with the disclosure herein were prepared as indicated in Table 1.

The compositions identified in the above were prepared via the following process.

Part A

The polymer(s) was/were mixed for a period of 30 seconds at 2000 rpm in a speedmixer. Then the conductive filler and filler 1 were introduced and the composition was mixed for a further period of 30 seconds at 2000 rpm in a speedmixer.

Part B

Cross-linker 1 was mixed with the appropriate catalyst and, when present adhesion promoter. The components were mixed for 2×30 seconds in a speedmixer at 2000 rpm. The resulting mixture was either used immediately or was stored in a 300 ml cartridge prior to use to avoid moisture ingress.

TABLE 1

Compositions of Examples (wt. %) and Comp. 1

|  | Ex. 1 | Ex. 2 | Ex. 3 | Ex. 4 | Comp. 1 |
|---|---|---|---|---|---|
| Base, Part A | | | | | |
| Dimethylhydroxy terminated Poly dimethyl siloxane-viscosity 75 mPa.s |  | 23.53 |  | 23.53 |  |
| Dimethylhydroxy terminated Polydimethylsiloxane-viscosity 450 mPa.s | 47.06 |  | 47.06 |  | 100.00 |
| trimethyl terminated polydimethylsiloxane viscosity 1000 mPa.s |  | 23.53 |  | 23.53 |  |
| Conductive filler | 35.29 | 35.29 | 35.29 | 35.29 |  |
| Filler 1 | 17.65 | 17.65 | 17.65 | 17.65 |  |
| Curing Agent, Part B | | | | | |
| Cross-linker 1 | 98.04 | 98.04 | 98.62 | 98.62 | 99.01 |
| Tetra n-butyl titanate | 1.37 |  | 1.38 |  | 0.50 |
| Tetra t-butyl titanate |  | 1.37 |  | 1.38 |  |
| Adhesion Promoter | 0.59 | 0.59 |  |  | 0.50 |

Parts A and B were mixed in the ratios as indicated in Table 2. The Si—OH:Si—OR ratios for each sample was provided as were the viscosity values of each part prior to mixing and of the final composition after parts A and B were mixed.

Mixture of Part A and Part B

Part A and part B were mixed in accordance to the weight ratio indicated in Table 2 below for a period of 30 seconds at 2000 rpm in a speedmixer 4 times.

TABLE 2

Features of Examples in Table 1

|  | Ex. 1 | Ex. 2 | Ex. 3 | Ex. 4 | Comp. 1 |
|---|---|---|---|---|---|
| A:B mix ratio (wt.) | 6:1 | 2:1 | 6:1 | 2:1 | 1:1 |
| OH/SiOR ratio (mol) | 0.6 | 0.5 | 0.6 | 0.5 |  |
| Viscosity of Part A (mPa.s) | 3000 | 2600 | 3000 | 2600 | 450 |
| Viscosity of Part B (mPa.s) | 600 | 600 | 550 | 550 | 460 |
| Viscosity of Mixed (mPa.s) | 3200 | 3400 | 3200 | 3300 | 500 |

The resulting compositions were then allowed to cure and a series of physical property tests were undertaken.

(i) The flowability test evaluated the flowability of the sample by allowing a small ball of the material (about 4.7 g) to stand undisturbed on a glass plate at room temperature and 50% relative humidity for a period of an hour and analyzing the base circle caused by the resulting flow. Samples having a diameter measured to be ≥35 mm after the one hour period were considered to have "good" flowability.

(ii) The Tack free time was determined by spreading an uncured sample having a thickness of about 0.35 cm on a clean smooth surface at 25° C. and 50% relative humidity and periodically touching the surface of the sample with a fingertip until the sample does not adhere to the fingertip.

(iii) Flip over time was determined by filling standard sized aluminium cups with samples of the final composition after mixing to a height of about 15 mm. The samples were then cured at either room temperature (about 25° C.) or at 65° C. Periodically a cup was inverted or "flipped-over". The point in time when the composition had cured sufficiently so that upon inversion there was no substantial movement of the curing composition was deemed to be the Flip over Time and was noted.

(iv) Shore A Hardness samples tested had a 10 mm thickness and were allowed to cure for 7 days at room temperature before testing.

The results of the physical property testing of the examples are depicted in Table 3 below.

TABLE 3

Physical Properties of Examples

|  | Ex. 1 | Ex. 2 | Ex. 3 | Ex. 4 | Ex. 5 |
|---|---|---|---|---|---|
| Flowability | Good | Good | Good | Good | Good |
| Tack-Free-Time (RT) | 1 hr | 0.5 hr | 50 mins | 0.5 hr | 55 mins |
| Flip over time (RT) | <3 hrs | <3 hrs | <3 hrs | <3 hrs | 6 hrs |
| Flip over time (65° C.) | 1 hr | 1 hr | 50 mins | 45 mins | 1 hr |
| Shore A Hardness (ASTM D2240) | 0022 | 0035 | 0021 | 0032 | 0018 |

It can be seen from Comp. 1 that it is necessary to include filler, which will provide moisture in the bulk of the composition in order to generate appropriate Flip over times at room temperature.

A series of further comparative examples were also prepared. They were prepared in accordance with the processes indicated above for the examples using the amounts indicated in Table 4 below.

TABLE 4

Compositions of Comparative Examples (wt. %)

|  | Comp Ex. 2 | Comp Ex. 3 | Comp Ex. 4 | Comp Ex. 5 |
|---|---|---|---|---|
| Base, Part A |  |  |  |  |
| Dimethylhydroxy terminated Polydimethylsiloxane-viscosity-2500 mPa.s) | 41.49 | 57.14 | 47.06 | 100.00 |
| Conductive filler |  |  | 35.29 |  |
| Filler 1 |  | 42.86 | 17.65 |  |
| Filler 2 | 58.51 |  |  |  |
| Curing Agent, Part B |  |  |  |  |
| Cross-linker 2 | 99.01 | 99.01 | 99.01 | 99.01 |
| Tetra n-butyl titanate | 0.99 | 0.99 | 0.99 | 0.50 |
| Adhesion promoter |  |  |  | 0.49 |

Parts A and B of the comparative examples were analogously mixed as described above for the examples in the amounts indicated in Table 5 below. Again, the Si—OH:Si—OR ratios are provided as are the viscosity of each part prior to mixing and of the final composition after parts A and B were mixed.

TABLE 5

Features of Comparative Examples in Table 4

|  | Comp Ex. 2 | Comp Ex. 3 | Comp Ex. 4 | Comp Ex. 5 |
|---|---|---|---|---|
| A:B mix ratio (wt.) | 10:1 | 7:1 | 7:1 | 1:1 |
| OH/SiOR ratio (mol) | 1.5 | 1.1 | 1.1 |  |
| Viscosity of Part A (mPa.s) | 26,000 | 7000 | 18,000 | 2500 |
| Viscosity of Part B (mPa.s) | 2100 | 2100 | 2100 | 2200 |
| Viscosity of Mixed (mPa.s) | 18,000 | 4200 | 12,000 | 2350 |

The resulting compositions were then allowed to cure and a series of physical property tests were undertaken using the same processes as used in the examples above.

TABLE 6

Physical Properties of Comparative Examples

|  | Comp Ex. 2 | Comp Ex. 3 | Comp Ex. 4 | Comp Ex. 5 |
|---|---|---|---|---|
| Flow-ability | Poor | Good | Poor | Good |
| Tack-Free-Time (RT) | 8 hrs | 3 hrs | 2 hrs | 50 mins |

TABLE 6-continued

Physical Properties of Comparative Examples

|  | Comp Ex. 2 | Comp Ex. 3 | Comp Ex. 4 | Comp Ex. 5 |
|---|---|---|---|---|
| Flip over time (RT) | >12 hrs | >5 hrs | 4 hrs | 6 hrs |
| Flip over time (65° C.) | >5 hrs | >3 hrs | 2 hrs | 1 hr |
| Hardness (Shore) | 00016 | 00022 | 0020 | 0040 |

It can be seen that one or both of the flip over time and tack free times of the comparative examples were significantly greater than those of the results in Table 3 above.

It can also be seen from Comp. Examples 1 and 5 that the absence of a filler has a negative effect on the results. This is thought to be because of the reduction in moisture presence within the composition from the quartz when present.

The invention claimed is:

1. A multiple part condensation curable gel composition comprising:
   (i) at least one condensation curable silyl terminated polymer having at least two hydroxyl functional groups per molecule and a viscosity<1000 mPas at 25° C.;
   (ii) a cross-linker selected from silyl functional molecules having at least two silyl groups, each silyl group containing at least two hydrolysable groups, and having a viscosity≤1000 mPas at 25° C., provided such viscosity is at least 75% of the viscosity of polymer (i);
   (iii) a condensation catalyst selected from the group consisting of titanates, zirconates, and combinations thereof; and
   (iv) one or more reinforcing and/or non-reinforcing filler(s);
   wherein:
   (a) catalyst (iii) and filler(s) (iv) are not stored together before cure of the composition;
   (b) the ratio of Si—OH groups:Si-hydrolysable groups in the composition is from 0.4:1 to 0.95:1; and
   (c) upon curing the composition has a tack free time of ≤1 hour and a flip over time of ≤3 hours.

2. The multiple part condensation curable gel composition in accordance with claim 1, wherein cross-linker (ii) is a silicone or an organic polymer chain bearing alkoxy functional terminal groups.

3. The multiple part condensation curable gel composition in accordance with claim 1, wherein cross-linker (ii) is a silicone polymer chain bearing alkoxy functional terminal groups.

4. The multiple part condensation curable gel composition in accordance with claim 1, wherein polymer (i) additionally comprises polydiorganosiloxanes which have one silanol containing terminal group and one unreactive terminal group.

5. The multiple part condensation curable gel composition in accordance with claim 1, wherein cross-linker (ii) additionally comprises silyl functional molecules having at least two silyl groups, where at least one silyl group contains one hydrolysable group.

6. The multiple part condensation curable gel composition in accordance with claim 1, wherein the composition is stored in two-parts, i) a base part comprising polymer (i) and filler(s) (iv), and ii) a curing part comprising cross-linker (ii) and catalyst (iii).

7. The multiple part condensation curable gel composition in accordance with claim 1, which additionally comprises one or more thermally and/or electrically conductive filler(s).

8. The multiple part condensation curable gel composition in accordance with claim 1, which additionally comprises one or more adhesion promoter(s) in an amount of from 0.1 to 2 wt. % of the total composition.

9. The multiple part condensation curable gel composition in accordance with claim 1, wherein catalyst (iii) is present in a molar amount which is at least 50% of the molar amount of water present in the composition, from filler(s) (iv), as determined in accordance with ISO 787-2:1981.

10. The multiple part condensation curable gel composition in accordance with claim 1, wherein cross-linker (ii) has a viscosity≤1000 mPas at 25° C., provided such viscosity is at least 90% of the viscosity of polymer (i).

11. A method of preparing a cured gel material from the multiple part condensation curable gel composition in accordance with claim 1, the method comprising:
   mixing the multiple parts of the condensation curable gel composition together to form a mixture; and
   applying the mixture onto a substrate and allowing to cure.

12. A cured gel material which is the reaction product of the multiple part condensation curable gel composition in accordance with claim 1, wherein:
   (a) catalyst (iii) and filler(s) (iv) are not stored together before cure of the composition;
   (b) the molar ratio of Si—OH groups:Si-alkoxy groups in the composition is from 0.4:1 to 0.95:1; and
   (c) upon curing the composition has a tack free time of ≤1 hour and a flip over time of ≤3 hours.

13. An electrical or electronic part encapsulated or potted with the cured gel material in accordance with claim 12, wherein the electrical or electronic part is:
   i) a metal substrate selected from the group consisting of gold, silver, aluminium, copper, and electroless nickel; and/or
   ii) a polymeric substrate selected from the group consisting of FR4, Nylon, polycarbonate, polymethylmethacrylate, polybutylene terephthalate, and liquid crystal polymers.

14. An electrical or electronic part encapsulated or potted with the cured gel material in accordance with claim 12, comprising a light emitting device comprising one or more a light-emitting diodes (LED), or liquid crystal displays (LCD).

15. An electrical or electronic part encapsulated or potted with the cured gel material in accordance with claim 12, selected from the group consisting of a chip, one or more wires, one or more sensors, one or more electrodes, integrated circuits (ICs), power devices, insulated gate bipolar transistor (IGBT), a rectifier, a Schottky diode, a PiN diode, a merged PiN/Schottky (MPS) rectifier and Junction barrier diode, bipolar junction transistors (BJTs), a thyristor, a metal oxide field effect transistor (MOSFET), a high electron mobility transistor (HEMT), static induction transistors (SIT), and a power transistor.

16. An encapsulant or a pottant for electrical and/or electronic devices, solar photovoltaic modules, and/or light emitting diodes, wherein the encapsulant or pottant is formed from the multiple part condensation curable gel composition in accordance with claim 1.

17. Electronic devices, solar photovoltaic modules and/or light emitting diodes comprising an encapsulant or a pottant, wherein the encapsulant or pottant comprises the cured gel material in accordance with claim 12.

18. The electronic devices, solar photovoltaic modules, and/or light emitting diodes in accordance with claim 17, selected from the group consisting of a chip, one or more wires, one or more sensors, one or more electrodes, integrated circuits (ICs), power devices, insulated gate bipolar transistor (IGBT), a rectifier, a Schottky diode, a PiN diode, a merged PiN/Schottky (MPS) rectifier and Junction barrier diode, bipolar junction transistors (BJTs), a thyristor, a metal oxide field effect transistor (MOSFET), a high electron mobility transistor (HEMT), static induction transistors (SIT), and a power transistor.

* * * * *